United States Patent

Thioux

[11] 4,053,031
[45] Oct. 11, 1977

[54] PISTON ACTUATED DISC BRAKE WITH MEANS FOR PUSHING THE PISTON

[75] Inventor: Alain Thioux, Chennevieres, France

[73] Assignee: Societe Anonyme D.B.A., Paris, France

[21] Appl. No.: 742,960

[22] Filed: Nov. 17, 1976

[30] Foreign Application Priority Data

Dec. 3, 1975 France .................. 75.36946

[51] Int. Cl.² .............................. F16D 55/02
[52] U.S. Cl. ............................. 188/71.9; 188/73.6
[58] Field of Search ........... 188/71.8, 71.9, 72.7, 188/72.8, 72.9, 72.6, 73.3, 73.5, 73.6, 196 V, 205 A, 106 F, 73.4, 72.4

[56] References Cited

U.S. PATENT DOCUMENTS

| 3,493,084 | 2/1970 | Maurice | 188/73.4 X |
| 3,920,103 | 11/1975 | Haraikawa | 188/72.6 X |
| 3,942,612 | 3/1976 | LeMarchand et al. | 188/73.6 |

*Primary Examiner*—Trygve M. Blix
*Assistant Examiner*—Douglas C. Butler
*Attorney, Agent, or Firm*—Paul David Schoenle; Ken C. Decker

[57] ABSTRACT

A disc brake comprising a piston mounted in a cylinder associated with a carrying member movable towards a rotary disc from an idle position to urge directly a friction pad towards the corresponding face of the disc is disclosed. The friction pad slidably cooperates with appropriate surfaces defined on two circumferentially spaced edges of an aperture provided in the carrying member, at least one of the edges comprising a slot offset towards the piston relative to the appropriate surfaces to permit radial extraction of the pad when the latter is brought opposite the slot. The piston is adapted to be pushed back away from the disc towards its idle position in opposition to an automatic adjuster associated with the piston to permit radial extraction of the pad by introduction of a tool between the pad and the piston after removal of a wedge forming element normally inserted therebetween.

8 Claims, 3 Drawing Figures

PISTON ACTUATED DISC BRAKE WITH MEANS FOR PUSHING THE PISTON

The invention relates to a disc brake for a automotive vehicle.

More particularly, the invention concerns a disc brake of the type comprising brake applying means associated with a carrying member so as to urge two friction pads towards the respective faces of a rotary disc, the brake applying means comprising at least one piston mounted in a cylinder and movable towards the disc from an idle position to urge one of the pads towards the corresponding face of the disc when the brake is operated, the carrying member comprising an aperture defining two circumferentially spaced edges, each of which comprises at least one sliding surface with which the said pad cooperates in accordance with the wear on its lining, at least one of the edges also comprising a slot offset towards the piston relative to the corresponding sliding surface, means being provided to push the piston back away from the disc towards said idle position, so that the pad can be brought opposite the slot, whose dimensions permit radial extraction of the pad through the aperture.

Brakes of this type have numerous advantages over other known brakes in the prior art. A problem arises, however, when adjusting means are associated with the piston which operates the brake. The adjusting means usually comprise an extensible member formed of two elements which can turn relative to one another, and the means for retracting the extensible member are often situated at that end of this member cooperating with the pad. Also, operation of them requires the introduction of a tool between the pad and the piston, this tool being selected so that it turns the piston in the direction corresponding to a reduction in length of the extensible member. When the pad cannot be removed until after the piston has been pushed back away from the disc, however, there is practically no space between the piston end and the adjoining face of the pad when the pad lining is worn, and it is therefore impossible to push the piston back into its bore.

BRIEF SUMMARY OF THE INVENTION

The invention proposes to avoid this drawback by providing a disc brake of the above-mentioned type, characterized in that automatic adjusting means are associated with the piston, the means for pushing back the piston in opposition to the adjusting means being operated by introduction of a tool between the pad and the piston after removal of a wedge forming element normally inserted therebetween.

In a preferred embodiment of the invention, the wedge forming element is associated with the pad by removable connecting means.

BRIEF DESCRIPTION OF THE DRAWINGS

A particular embodiment of the invention will now be described by way of example with reference to the accompanying drawings, in which.

DETAILED DESCRIPTION.

Figure 1:
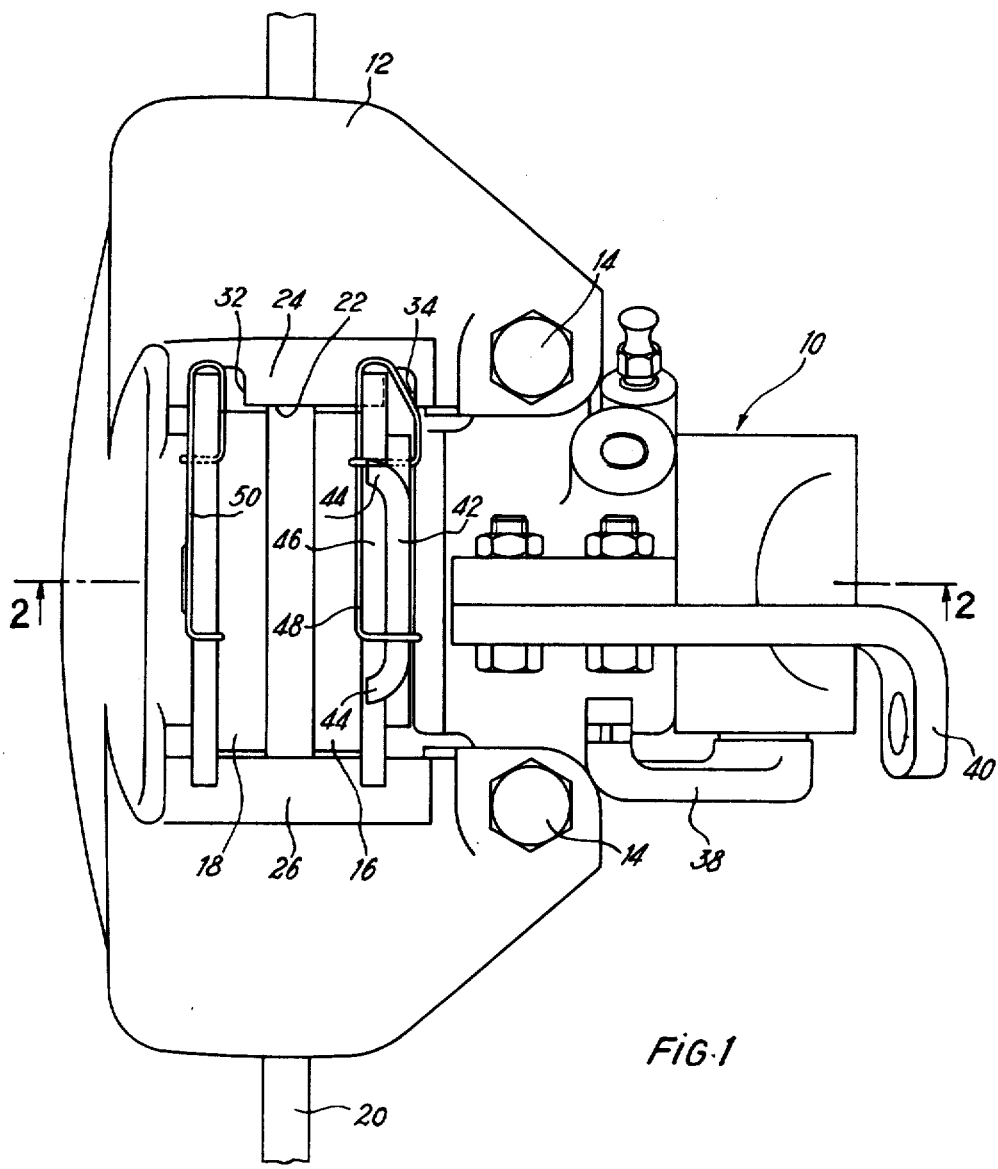
FIG. 1 represents a plan view of a disc brake embodying the principles of the invention.
Figure 3:
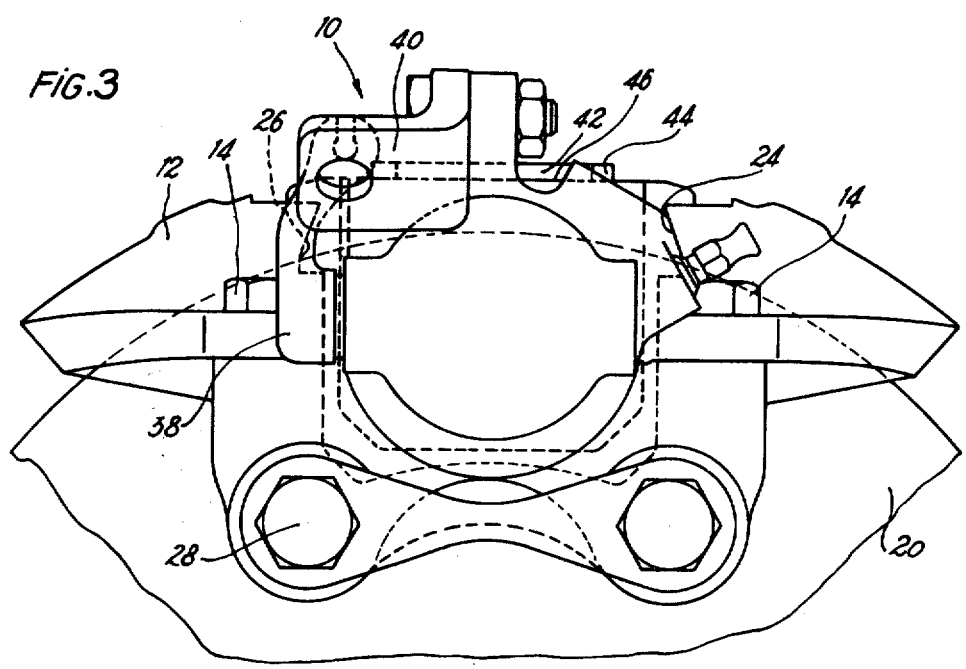
FIG. 3 is an end view of the brake shown in FIGS. 1 and 2.

The disc brake shown in FIGS. 1 and 3 comprises brake applying means generally designated 10 associated with a frame 12 by connecting means 14 such as screws or rivets. The frame 12 acts as a carrying member for two friction pads 16, 18 arranged on opposite sides of a disc 20 associated with a rotary part of the vehicle (not shown). Each of the pads 16, 18 comprises a backing plate bearing a friction lining. The frame 12 contains an aperture 22 which receives the pads 16, 18. The aperture 22 is substantially rectangular and defines two circumferentially spaced edges 24, 26 on which there are formed two V-shaped surfaces which constitute guide ramps receiving the circumferentially spaced ends of the pads 16, 18. The V-shaped surfaces formed on the edges 24, 16 therefore constitute anchoring surfaces for the pad 18 and anchoring and sliding surfaces for the pad 16. In effect, the pad 16 can slide axially relative to the frame 12 when operated by the breke applying means 10, whereas the pad 18 cannot move relative to the frame 12 and the latter can slide along mounting pins 28 associated with a fixed component 30 when the brake applying means 10 are operated.

As shown in FIG. 1, a slot 32 is provided in the edge 24 of the aperture 22. The slot 32 is offset towards the disc 20 relative to the anchoring surface for the pad 18 on the edge 24, and its dimensions are such that the pad 18 can be inserted and extracted radially through the aperture 22 when its backing plate is brought opposite the slot 32. Similarly the edge 24 of the aperture 22 contains a second slot 34, which is offset towards the brake applying means 10 relative to the sliding and anchoring surface with which the pad 16 cooperates on the edge 14, in accordance with the wear on its lining. The dimensions of the slot 34 are such as to permit radial extraction of the pad 16 through the aperture 22 when the backing plate of the pad 16 is brought opposite the slot 34.

Figure 2:
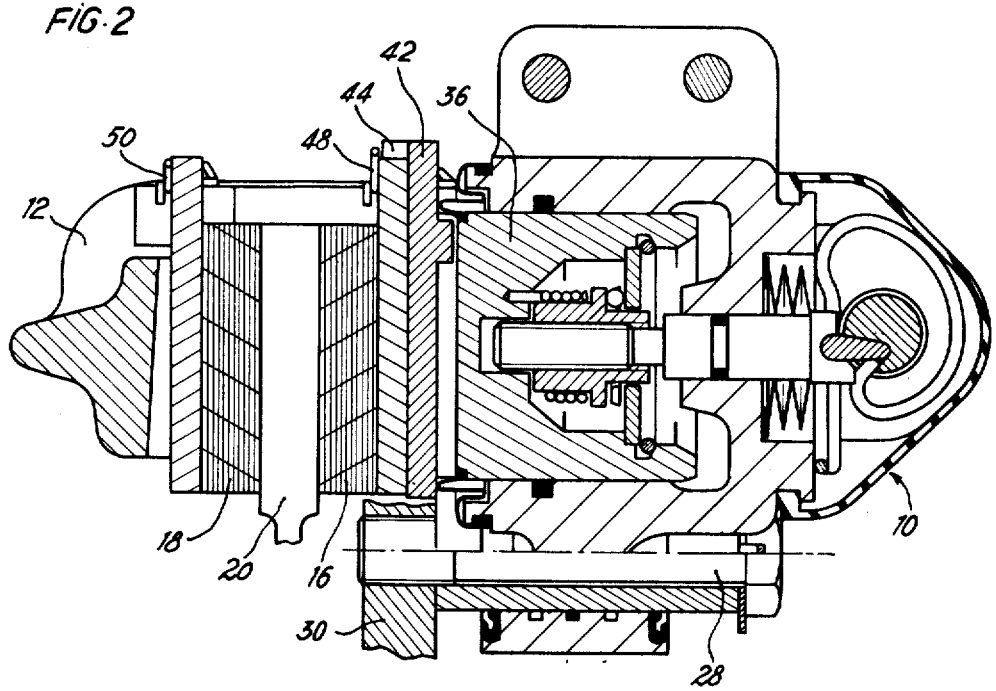
FIG. 2 is a section along a line 2-2 in FIG. 1.

The brake applying means 10 comprise a piston 36 of which operation is effected, in the embodiment described, by a cam-type mechanical device controlled by a lever 38, which in turn is controlled by a cable (not shown) whose sheath is fastened to a fixed lever 40. As shown in FIG. 2, the rotation of the lever 38 gives rise in a known manner to rotation of a cam which urges the piston 36 towards the disc 20 by way of automatic adjusting means. The adjusting means are well known in the art and will not be described herein in details. It will be sufficient to understand that these means, provided for automatic compensation of the wear on the linings of the pads 16 and 18, comprise an extensible member whose length is controlled by the relative rotation of two elements which cooperate by means of a screw and nut connection. Such adjusting means progressively modify the idle position of the piston 36 relative to the disc 20 in proportion to the wear on the lining of the pad 16. For this reason, in a known manner, means are provided to push the piston 36 back towards the position in which the adjusting means are retracted when the linings of the pads 16, 18 are worn. These means comprise a recess or the like formed in that end of the piston 36 nearer the pad 16. The recess is provided to receive an appropriate tool and to allow the piston 36 to be turned in the direction corresponding to retraction of the extensible member.

According to the invention, to permit insertion of a tool between the piston the piston 36 and pad 16 when the friction linings are worn, a wedge forming element 42 is disposed between these two components of the brake. The element 42 is a plate which is slightly thicker than the tool for pushing back the piston, and which is attached to the backing plate of the pad 16 by fixing means consisting of two lugs 44 on the plate 42. The lugs are bent axially towards the disc 20 and are arranged so as to cooperate with the upper edge 46 of the backing plate of the pad 16. The means for fixing the plate 42 to the pad 16 also comprise a clip 48 formed by the noise-reducing spring for the pad 16. The noise-reducing spring 48 is made of a wire. One portion of the spring traverses holes in the backing plate of the pad 16 and in the plate 42, another bears on the upper edge of the plate 42, and a third bears on the edge 24 of the aperture 22, thereby resiliently urging the pad 16 towards the interior of the brake and removably connecting the plate 42 to the pad 16.

A second noise-reducing spring 50 made of a wire, is attached in a similar manner to the backing plate of the pad 18, to resiliently urge the pad 18 towards the interior of the brake.

As a result of this arrangement the plate 42 can be extracted radially after removal of the clip 48, and the installation and removal of the pads can be carried out with the disc in position, according to the following steps When the pads are put on, the piston 36 is pushed back as far as possible to the right viewing FIGS. 1 and 2, so that the assembly formed by the frame 12 and brake applying means 10 can be slide as far as possible to the left along the pins 28 to permit radial insertion of the pad 18 through the aperture 22 and slot 32. When the pad 18 is in position, the assembly formed by the frame 12 and brake applying means 10 is moved as far as possible to the right viewing FIGS. 1 and 2. At this moment, since the wedge forming element 42 is not in position, the pad 16 can be introduced through the aperture 22 and slot 34 and then moved into the position which it occupies in FIGS. 1 and 2. The wedge forming element 42 is then inserted between the backing plate of the pad 16 and the piston 36 and is locked on to the pad 16 with the clip 48, the noise-reducing spring 50 being also mounted on the pad 18.

When the pad linings are worn, thereby requiring replacement of the pads 16 and 18, the automatic adjusting means associated with the piston 36 have brought the latter into the position as far as possible to the left viewing FIGS. 1 and 2. The noise-reducing springs 48, 50 are first removed from their respective pads 16, 18 so that the wedge forming element 42 can be extracted radially through the aperture 22. An appropriate tool can then be inserted between the backing plate of the pad 16 and the piston 36 so as to turn the latter in the direction corresponding to its withdrawal to the right viewing FIGS. 1 and 2. When the piston 36 is in its extreme right-hand position, the pad 16 can be extracted radially through the slot 34 and aperture 22. The assembly formed by the frame 12 and brake applying means 10 is then pushed to the left viewing FIGS. 1 and 2, so that the pad 18 can be extracted radially through the aperture 22 and slot 32. New pads are then inserted according to the hereinabove described steps.

The invention has been described with reference to a disc brake with a sliding frame, but it will be appreciated that it can be applied to a sliding-caliper disc brake or to a fixed-caliper disc brake. In the latter case a wedge forming element similar to the element 42 is inserted between each pad and its brake applying means. Similarly, the disc brake shown by way of example has only one slot to allow radial extraction of each pad 16 or 18, but a slot like slot 32 and a slot like slot 34 may also, of course, be formed in the edge 26 of the aperture 22.

I claim:

1. A disc brake comprising brake applying means associated with a carrying member so as to urge two friction pads towards the respective faces of a rotary disc, the brake applying means comprising at least one piston mounted in a cylinder and movable towards the disc from an idle position to urge one of the pads towards the corresponding face of the disc when the brake is operated, the carrying member comprising an aperture defining two circumferentially spaced edges, each of which comprises at least one sliding surface with which the one pad cooperates in accordance with the wear on its lining, at least one of the edges also comprising a slot offset towards the piston relative to the corresponding sliding surface, means being provided to push the piston back away from the disc towards said idle position, so that the pad can be brought opposite the slot, whose dimensions permit radial extraction of the pad through the aperture, wherein automatic adjusting means are associated with the piston, the means for pushing back the piston in opposition to the adjusting means being operated by introduction of a tool between the one pad and the piston after removal of a wedge forming element normally inserted therebetween.

2. A disc brake as claimed in claim 1, wherein the adjusting means comprise an extensible member made of two elements associated by a screw and nut connection, one of these elements being associated to the piston, the means for pushing back the piston being formed by the screw and nut connection combined with means for turning the piston in the direction corresponding to a reduction in length of the extensible member.

3. A disc brake as claimed in claim 2, wherein the said means for turning the piston comprise at least one recess formed in the piston end adjacent to the wedge forming element.

4. A disc brake as claimed in claim 1, wherein the wedge forming element is associated with the one pad by removable connecting means.

5. A disc brake as claimed in claim 4, wherein the wedge forming element is radially extractible through the aperture after removal of the connecting means.

6. A disc brake as claimed in claim 4 wherein the removable connecting means comprise at least one lug provided on said wedge forming element, said lug extending towards the disc to engage the upper edge of the one pad.

7. A disc brake as claimed in claim 6, wherein the removable connecting means also comprise a clip passing through a hole in the pad and a hole in the said element and bearing on at least one edge of the pad and one edge of the element.

8. A disc brake as claimed in claim 7, wherein the clip is formed by a noise-reducing spring associated with the one pad.

* * * * *